United States Patent
Bitsch (10) Patent No.: US 10,054,109 B2
(45) Date of Patent: Aug. 21, 2018

(54) MAIN BEARING ARRANGEMENT FOR A WIND TURBINE

(71) Applicant: Vestas Wind System A/S, Aarhus N. (DK)

(72) Inventor: Michael Lundgaard Bitsch, Langa (DK)

(73) Assignee: Vestas Wind Systems A/S, Aarhus N. (DK)

( * ) Notice: Subject to any disclaimer, the term of this patent is extended or adjusted under 35 U.S.C. 154(b) by 393 days.

(21) Appl. No.: 14/406,975

(22) PCT Filed: Jun. 6, 2013

(86) PCT No.: PCT/DK2013/050175
§ 371 (c)(1),
(2) Date: Dec. 10, 2014

(87) PCT Pub. No.: WO2013/185768
PCT Pub. Date: Dec. 19, 2013

(65) Prior Publication Data
US 2015/0159631 A1    Jun. 11, 2015

Related U.S. Application Data (60) Provisional application No. 61/657,846, filed on Jun. 10, 2012.

(30) Foreign Application Priority Data

Sep. 12, 2012  (DK) .................................. 2012 70558

(51) Int. Cl.
*F03D 15/00* (2016.01)
*F03D 80/70* (2016.01)
(Continued)

(52) U.S. Cl.
CPC .......... *F03D 11/0008* (2013.01); *F03D 15/00* (2016.05); *F03D 80/70* (2016.05);
(Continued)

(58) Field of Classification Search
CPC .......... F03D 80/70; F03D 80/80; F03D 80/88; F03D 1/065; F16C 19/225
See application file for complete search history.

(56) References Cited

U.S. PATENT DOCUMENTS 6,464,401 B1 * 10/2002 Allard .................. F16C 19/364
384/561
7,462,950 B2 * 12/2008 Hu ........................ F16C 39/066
290/44

(Continued)

FOREIGN PATENT DOCUMENTS

EP   1780409 A1   5/2007
EP   2014917 A1   1/2009
(Continued)

OTHER PUBLICATIONS

International Searching Authority, International Search Report and Written Opinion issued in corresponding International Application No. PCT/DK2013/050175, dated Sep. 13, 2013, 11 pages.

(Continued)

*Primary Examiner* — Logan Kraft
*Assistant Examiner* — John S Hunter
(74) *Attorney, Agent, or Firm* — Wood Herron & Evans LLP (57) ABSTRACT

A drivetrain for a horizontal axis wind turbine includes a main shaft, and a main bearing housing having a main body at least partly enclosing the main shaft and extending from a first end to a second end, a distance from the second end to the rotor attachment flange being larger than a distance from the first end to the rotor attachment flange. The main (Continued)

bearing housing: carries the main shaft via a first bearing and a second bearing, a distance between the second bearing and the rotor attachment flange being larger than a distance between the first bearing and the rotor attachment flange; has a first seat for the first bearing, and a second seat for the second bearing; and includes a seat flange extending from the main body at least partly radially inwards, the second seat being located on a distal end of the seat flange.

17 Claims, 5 Drawing Sheets

(51) Int. Cl.
    *F16C 19/54*       (2006.01)
    *F16C 35/04*       (2006.01)
    *F16C 19/36*       (2006.01)
    *F03D 11/00*      (2006.01)

(52) U.S. Cl.
    CPC .......... *F16C 19/364* (2013.01); *F16C 19/547* (2013.01); *F16C 35/045* (2013.01); *F05B 2240/50* (2013.01); *F16C 2360/31* (2013.01); *Y02E 10/722* (2013.01)

(56) References Cited

U.S. PATENT DOCUMENTS

| | | | | |
|---|---|---|---|---|
| 8,376,708 | B2* | 2/2013 | Patel | H02K 7/102 |
| | | | | 290/55 |
| 2009/0068018 | A1* | 3/2009 | Corten | F03D 1/0641 |
| | | | | 416/223 R |
| 2010/0074753 | A1* | 3/2010 | Berger | F03D 15/00 |
| | | | | 416/170 R |
| 2010/0133854 | A1* | 6/2010 | Jansen | F16H 1/28 |
| | | | | 290/1 C |
| 2010/0329867 | A1* | 12/2010 | Patel | H02K 7/102 |
| | | | | 416/169 R |
| 2011/0177844 | A1* | 7/2011 | Lowas, III | F03D 13/20 |
| | | | | 455/562.1 |
| 2012/0141270 | A1* | 6/2012 | Minadeo | F16C 33/6659 |
| | | | | 416/1 |

FOREIGN PATENT DOCUMENTS

| | | |
|---|---|---|
| EP | 2339176 A2 | 6/2011 |
| WO | 2012052022 A1 | 4/2012 |

OTHER PUBLICATIONS

Danish Patent and Trademark Office, Danish Search Report and Written Opinion issued in corresponding Danish Application No. PA 2012 70558, dated Apr. 25, 2013, 5 pages.

* cited by examiner

FIG. 6

MAIN BEARING ARRANGEMENT FOR A WIND TURBINE

TECHNICAL FIELD

The invention relates to a drivetrain for a horizontal axis wind turbine, comprising a main shaft provided with a rotor attachment flange adapted to be connected to a rotor of the wind turbine, and a main bearing housing carrying the main shaft via a first bearing and a second bearing. The invention also relates to a main bearing housing for a horizontal axis wind turbine, adapted to at least partially enclose a main shaft connected to a rotor of the wind turbine, the main bearing housing presenting a substantially circular component attachment flange for a connection of the main bearing housing to a further drivetrain component, where the further drivetrain component and the rotor are located at opposite ends of the main bearing housing.

BACKGROUND

Horizontal axis wind turbines usually include a tower carrying on its top a nacelle, and a rotor mounted on a drivetrain which is housed in the nacelle, The drivetrain usually includes a main shaft, a gearbox and a generator. In many turbines, the main shaft is carried, via two axially offset bearings, by a main bearing housing. The connection between the main shaft and the gearbox input shaft can be of any suitable type, for example it could be a rigid connection, or it could include a low speed coupling as exemplified in WO2012052022A1 allowing some flexibility in the alignment of the shafts. In some cases, the main bearing housing, the gearbox and the generator each have their respective direct support to a carrying structure of the nacelle. In other cases the gearbox and the generator are cantilevered, as exemplified below, from the main bearing housing, and in such cases the joint between the main bearing housing and a fixed body of the gearbox will experience relatively large forces. In addition, certain types of low speed couplings have a relatively large diameter. This will require a large diameter of any fixed connection between the main bearing housing and the fixed body of the gearbox. For example, the main bearing housing and the gearbox might be connected via relatively large cover for a low speed coupling between the main shaft and the gearbox input shaft. However, it might be desired to provide a main shaft that has a relatively small diameter at its connection to the gearbox, and therefore a small bearing between the main shaft and the main bearing housing.

SUMMARY

It is an object of the invention to provide in a wind turbine an effective and reliable main shaft bearing support, and an effective connection, in particular regarding loads, between a main bearing housing and a further drivetrain component, such as a gearbox.

This object is reached with a drivetrain for a horizontal axis wind turbine, drivetrain for a horizontal axis wind turbine, comprising
- a main shaft provided with a rotor attachment flange adapted to be connected to a rotor of the wind turbine, and
- a main bearing housing having a main body at least partly enclosing the main shaft and extending from a first end to a second end, a distance from the second end to the rotor attachment flange being larger than a distance from the first end to the rotor attachment flange, the main body presenting at the second end a component attachment flange for a connection of the housing to a further drivetrain component,
- the main bearing housing carrying the main shaft via a first bearing and a second bearing, a distance between the second bearing and the rotor attachment flange being larger than a distance between the first bearing and the rotor attachment flange,
- the main bearing housing having a first seat for the first bearing, and a second seat for the second bearing,
- the main bearing housing comprising a seat flange extending from the main body at least partly radially inwards, the second seat being located on a distal end of the seat flange.

Preferably, the main body of the main bearing housing extends along the rotational axis of the main shaft. In some embodiments, the further drivetrain component is a low speed coupling cover. In other embodiments, the component attachment flange of the main bearing housing is adapted for a connection of the housing directly to a fixed part of a gearbox or a generator.

The seat flange extending from the housing main body at least partly radially inwards, provides for the component attachment flange being located radially, in relation to a rotational axis of the main shaft, outside the second seat. I.e. the extension of the seat flange has a component in the radial direction; it could also have a component parallel to the rotational axis, but in any case the flange is oriented inwards from the main body, in a non-zero angle to the rotational axis.

The invention will allow for improving the force handling in drive trains where the further drivetrain component/components is/are cantilevered from the main bearing housing. The reason is that the connection between the further component(s) and the main bearing housing can be made relatively large to reduce the forces induced by the bending moment caused by the cantilevered arrangement, without compromising the design of the main shaft bearing arrangement, which can be kept relatively small as dictated by the size of the main shaft.

Thus, the reduced forces will allow for reducing the material. Also, since the connection between the main bearing housing and the further drivetrain component can be designed independently of the main shaft bearing arrangement, a relatively straight load path can be provided in the main bearing housing for stresses incurred by the cantilevered arrangement, with a large diameter at the connection to the further drivetrain component.

Also, the invention will be advantageous where a low speed coupling has a relatively large diameter requiring a large cover for the coupling. The component attachment flange can be made large for a connection to the cover, while the main shaft bearing can be kept considerably smaller to accommodate the main shaft.

Preferably, the seat flange is shaped as a truncated cone, where the distal end is the narrower end of the truncated cone, and where the distance from the distal end to the rotor attachment flange is larger than the distance from the wider end of the truncated cone to the rotor attachment flange. The truncated cone shape of the seat flange will provide an alignment of the seat flange with the force path associated with the second bearing, in particular where the second bearing is a tapered roller bearing, angled in the following manner (as exemplified in the drawings described below): The bearing rollers each have a first roller end and a second roller end, the distance between the rotor attachment flange and the first roller end being smaller than the distance between the rotor attachment flange and the second roller end, and the distance between the rotational axis of the main shaft and the first roller end being smaller than the distance between the rotational axis and the second roller end.

The invention also provides a main bearing housing for a horizontal axis wind turbine, adapted to at least partially enclose a main shaft connected to a rotor of the wind turbine, the main bearing housing presenting a substantially circular component attachment flange for a connection of the main bearing housing to a further drivetrain component, where the further drivetrain component and the rotor are located at opposite ends of the main bearing housing, the main bearing housing having a first seat for a first bearing between the main bearing housing and the main shaft, and a second seat for a second bearing between the main bearing housing and the main shaft, the distance from the component attachment flange to the first bearing seat being larger than the distance from the component attachment flange to the second bearing seat, the diameter of component attachment flange being larger than the diameter of the first bearing seat, and the diameter of the second bearing seat being equal to, or smaller than, the diameter of the first bearing seat.

Thereby, as has been mentioned above, the large component attachment flange provides for a good force handling capacity in view of the further drivetrain component being cantilevered from the main bearing housing, while a relatively small second bearing can be provided so as to be adapted for an optimized main shaft design.

Here the diameter of the component attachment flange is understood as the diameter of a region for transfer of loads between the component attachment flange and the further drivetrain component. For example. where there is a bolt connection between the component attachment flange and the further drivetrain component, with a single row of bolts and with the bolts oriented substantially in parallel to a rotational axis of the main shaft, the diameter of the component attachment flange is the diameter of an imaginary circle formed by the center lines of the series of bolts distributed along the component attachment flange. The diameters of the bearing seats are understood as the diameters of respective surfaces of the seats facing radially inwards and supporting the respective bearings.

Preferably, the difference between the component attachment flange diameter and the second bearing seat diameter is at least twice, preferably three times, as large as the difference between the diameters of the first and second bearing seats. Preferably, the diameter of the component attachment flange is at least 30%, preferably at least 40%, more preferably at least 50%, larger than the second bearing seat diameter.

DESCRIPTION OF THE DRAWINGS

Below embodiments of the invention will be described with reference to the drawings, in which.

DETAILED DESCRIPTION

Figure 1:
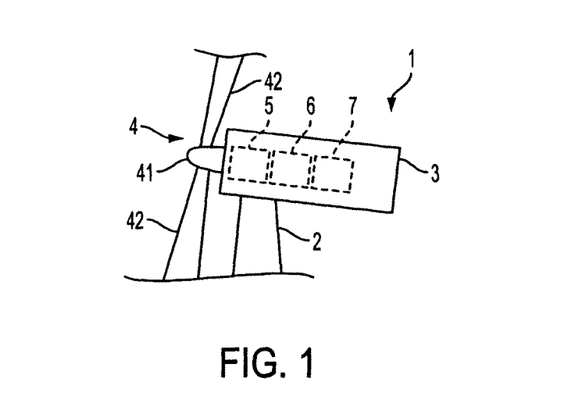
FIG. 1 shows a partial side view of a horizontal axis wind turbine.

The horizontal axis wind turbine 1 in FIG. 1 includes a tower 2 carrying on its top a nacelle 3 adapted to swing around a vertical axis in relation to the tower 2. The wind turbine also includes a rotor 4 with a hub 41 carrying three blades 42; alternatively there could be fewer or more than three blades on the hub 41. The hub is mounted on a drivetrain which is housed in the nacelle 3, The drivetrain includes a main shaft 5, gearbox 6 and a generator 7.

Figure 2:
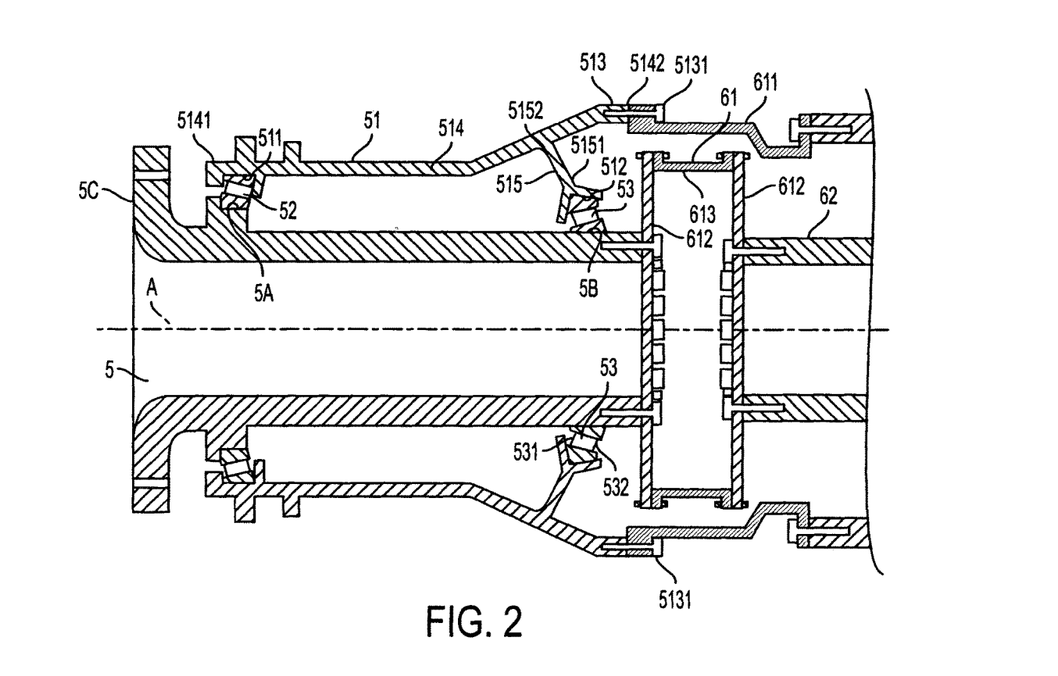
FIG. 2 shows a cross-sectional view of a part of a drivetrain for a wind turbine, the section coinciding with the rotational axis of a rotor of the wind turbine.
Figure 3:
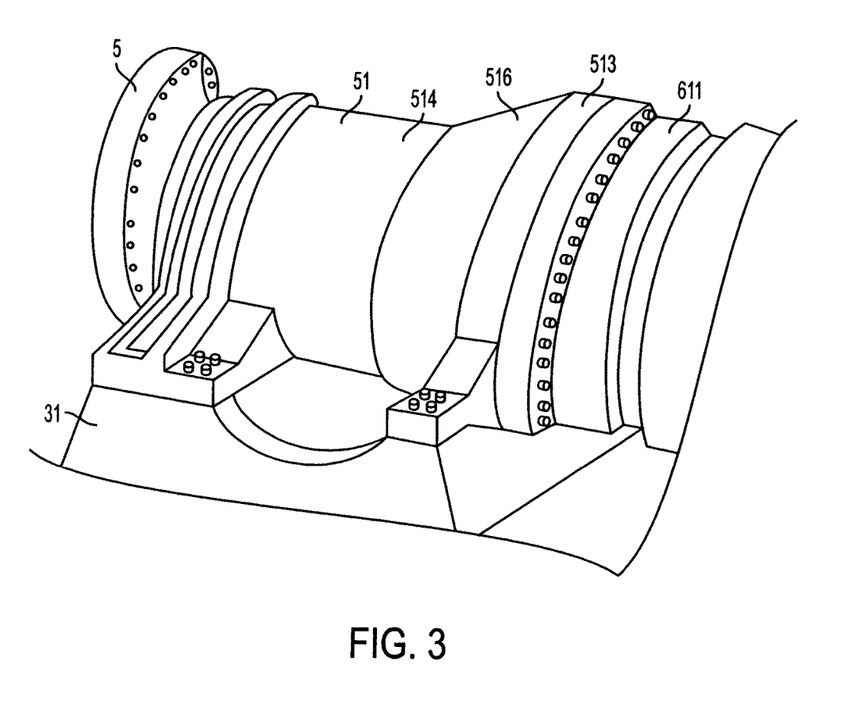
FIG. 3 shows a perspective view of the drivetrain part in FIG. 2

FIG. 2 shows parts of the drivetrain including the main shaft 5. The rotational axis of t e rotor 4 and the main shaft 5 is indicated in FIG. 2 with a broken line A. The main shaft 5 is at a first end (to the left in FIG. 2) provided with a rotor attachment flange 5C which is fixedly connected to the hub 41 (FIG. 1). At a second end (to the right in FIG. 2), the main shaft 5 is connected to a low speed coupling 61, in turn connected to an input shaft 62 of the gearbox 6. The main shaft 5 is carried via a main bearing arrangement 52, 53 by a main bearing housing 51. As can be seen in FIG. 3, the main bearing housing 51 is fixedly mounted on a bed frame 31 of the nacelle structure. As can be seen in FIG. 2, the main bearing arrangement includes a first and a second bearing 52, 53 distributed along the rotational axis A of the main shaft 5. The first and second bearings are in this embodiment roller bearings, but any of them could alternatively be of any type of bearing, e.g. a ball bearing.

The first bearing 52 is located closer to the hub than the second bearing 53. The first bearing 52, or more specifically, an outer ring of the first bearing 52, is fitted in a first seat 511 presented by the main bearing housing 51. The second bearing 53 is located close to the low speed coupling 61. An outer ring of the second bearing 53, is fitted in a second seat 512 also presented by the main bearing housing. Inner rings of the first and second bearings 52, 53 are fitted in respective seats 5A, 5B presented by the main shaft 5.

The main bearing housing 51 comprises a main body 514 that encloses the main shaft 5 and extends substantially in parallel with the rotational axis A from a first end 5141 to a second end 5142. The first end is closer to the rotor that the second end. At the second end 5142 the main body 514 presents a component attachment flange 513 for a fixed connection of the main bearing housing 51 to a low speed coupling cover 611, (see also FIG. 3), arranged to cover the low speed coupling 61. The component attachment flange has a substantially circular cross-section. The component attachment flange 513 is located radially, in relation to the rotational axis A, outside the second seat 512. In other words, the component attachment flange 513 is located further away from the rotational axis A than the second seat 512.

Figure 4:
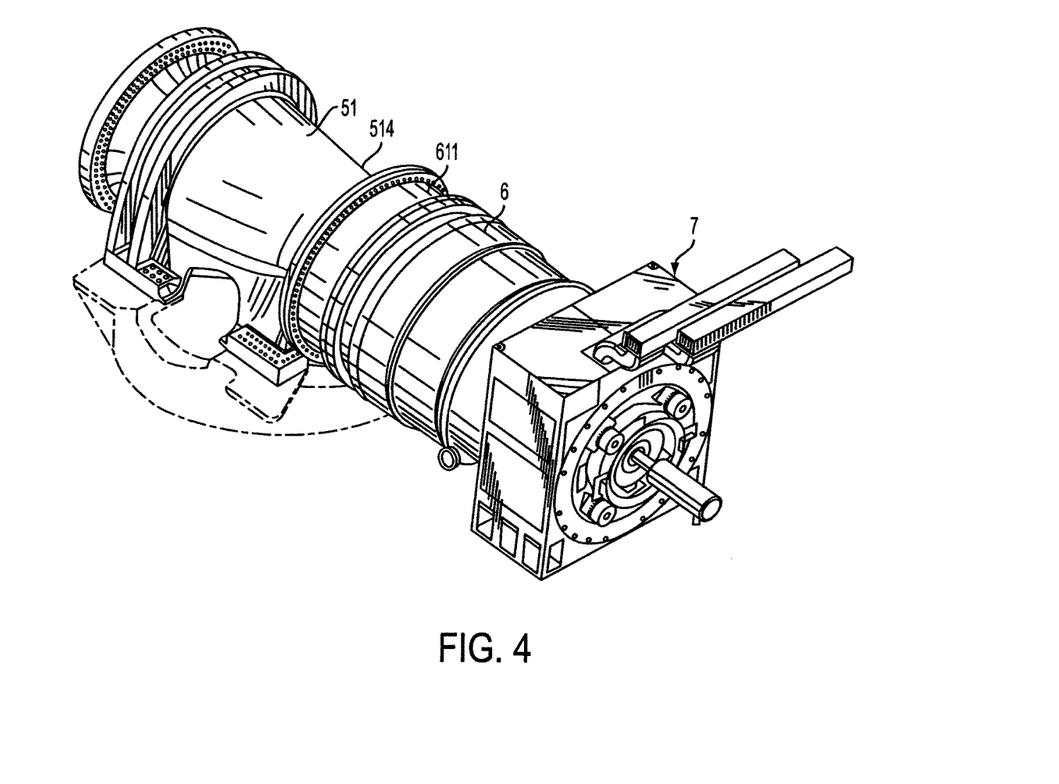
FIG. 4 shows a perspective view of the drivetrain partly shown in FIG. 3.

As illustrated in FIG. 4, the gearbox 6 and the generator 7 are not support directly on the nacelle structure. Instead they are cantilevered from the main bearing housing 51 via the low speed coupling cover 611. This means that the main bearing housing 51 and the low speed coupling cover 611 will be subjected to relatively large forces from the weights of the cantilevered components 6, 7. As can be seen in FIG. 3, the main bearing housing main body 514 is at a portion 516 extending from the component attachment flange 513 towards the rotor attachment flange 5C shaped as a truncated cone. This will provide for a relatively straight load path for stresses in the main body caused by the cantilevered components.

To provide for the shorter radial distance of the second seat 512, the main bearing housing is provided with a seat flange 515. The seat. flange 515 extends radially inwards from an inner surface of the main body 514. The seat flange 515 is provided with the second seat at its inner distal end. The seat flange 515 presents a non-zero angle to an imaginary plane oriented perpendicular to the rotational axis A, and has therefore the shape of a truncated cone with the end with the second seat 512 being the narrower end 5151 of the truncated cone and located further away from the rotor 4 compared to the wider end 5152 of the truncated cone where the seat flange 515 joins the main body 514. The junction between the seat flange 515 and the main body 514 is located at a distance from the second end 5142 and the component attachment flange 513.

The low speed coupling 61 can be of any type, e.g. one of the solutions described in WO2012052022A1 incorporated herein by reference. In this example, the low speed coupling has two flexible discs 612, which are at respective inner edges fixedly connected to the main shaft 5 and the gearbox input shaft 62, respectively. At respective outer edges the flexible discs 612 are fixedly joined via a cylinder 613. Such a low speed coupling will provide some flexibility to allow for misalignment and other un-desired phenomena that can occur in the drivetrain.

Due to the design of the low speed coupling 61, it will have a relatively large diameter, and therefore so will also the low speed coupling cover 611. As stated, the main bearing housing main body 514 is at a portion 516 extending from the component attachment flange 513 towards the rotor shaped as a truncated cone, (FIG. 3), and this provides a relatively straight load path for stresses incurred by the cantilevered arrangement. In addition, the seat flange 515 will allow for the main bearing housing main body 514 to present the large diameter component attachment flange 513, while at the same time providing a rigid support for the second bearing 53. Actually, the diameter of the main body 514 is larger at the second end 5142 than at the first end 5141. The large diameter of the component attachment flange 513 is beneficial in view of the loads, since the bending moment caused by the cantilevered arrangement will be counteracted by forces in the component attachment flange 513 that are lesser than they would have been with a smaller component attachment flange.

Furthermore, the truncated cone shape of the seat flange 515 provides an alignment of the flange with the force path associated with the second bearing 53, in particular where the latter is a tapered roller bearing, angled as indicated in the drawings. As can be seen in FIG. 2, the bearing rollers each have a first roller end 531 and a second roller end 532, the distance between the rotor attachment flange 5C and the first roller end 531 being smaller than the distance between the rotor attachment flange 5C and the second roller end 532, and the distance between the rotational axis A of the main shaft 5 and the first roller end 531 being smaller than the distance between the rotational axis A and the second roller end 532.

The diameter of component attachment flange 513 is larger than the diameter of the first bearing seat 511, and the diameter of the second bearing seat 512 is smaller than the diameter of the first bearing seat 511. There is a bolt connection between the component attachment flange 513 and the low speed coupling cover 611, with a single row of bolts 5131 oriented substantially in parallel to the rotational axis A. Here, the diameter of the component attachment flange 513 is understood as the diameter of an imaginary circle formed by the center lines of the series of bolts 5131 distributed along the component attachment flange 513. The diameters of the bearing seats 511, 512 are understood as the diameters of respective surfaces of the seats facing radially inwards and supporting the respective bearings 52, 53.

Figure 5:
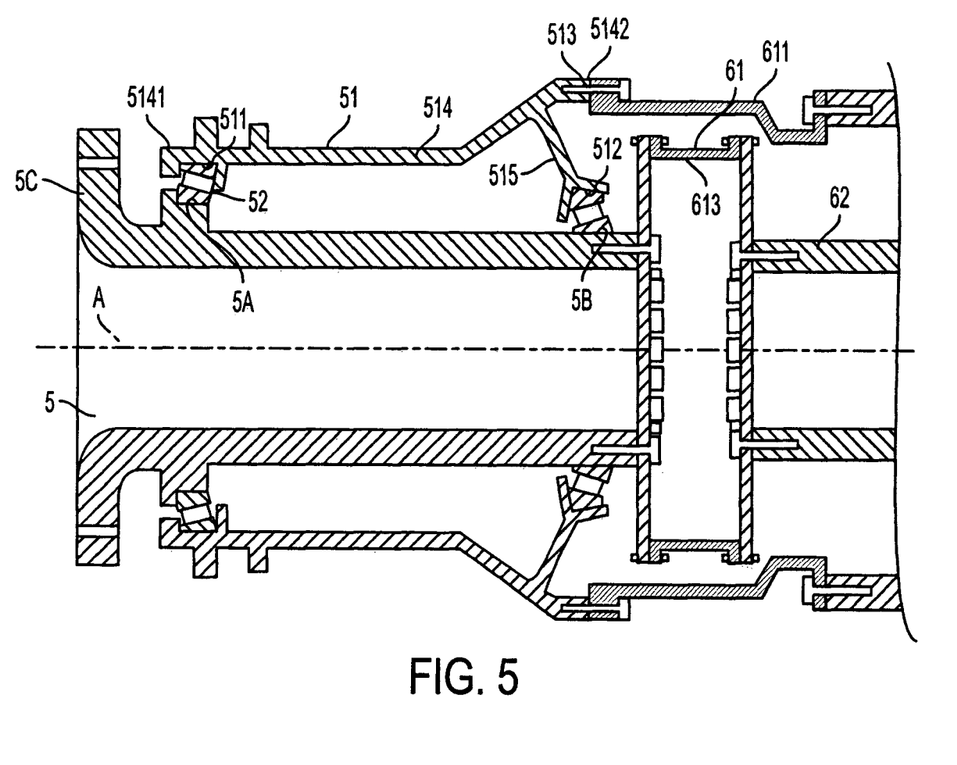
FIG. 5 shows a cross-sectional view of a part of a wind turbine drivetrain according to an alternative embodiment of the invention, the section coinciding with the rotational axis of a rotor of the wind turbine.

FIG. 5 shows an embodiment where the component attachment flange 513 is located adjacent to the outer periphery of the seat flange 515. I.e. the component attachment flange 513 is located adjacent to the connection between the seat flange 515 and the main bearing housing main body 514.

Figure 6:
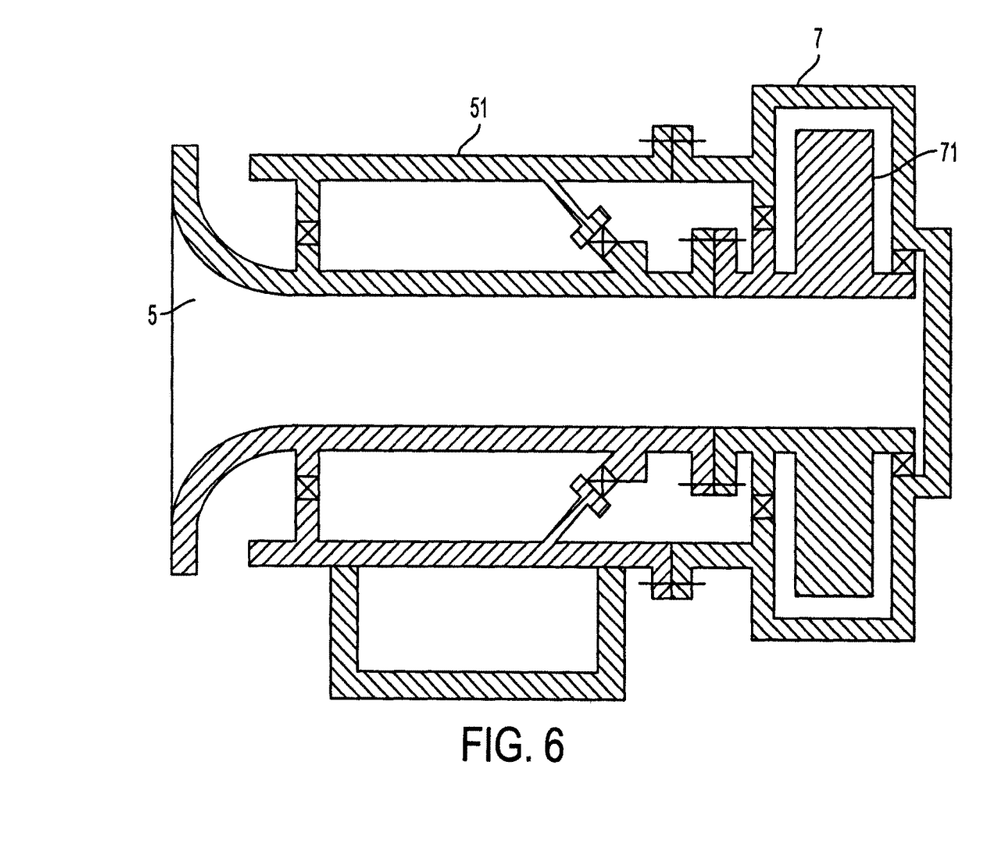
FIG. 6 shows a cross-sectional view of a part of a drivetrain for a wind turbine according to an alternative embodiment of the invention, the section coinciding with the rotational axis of a rotor of the wind turbine.

The invention is applicable also to turbines without any gearbox in the drivetrain, i.e. so called direct drive turbines. Thereby, the invention could be particularly useful where, as illustrated in FIG. 6, the generator 7 is cantilevered from the main bearing housing 51, and the main shaft 5 is connected to a rotor 71 of the generator 7, e.g. directly (as in FIG. 6) or via a low speed coupling, e.g. as described in said WO2012052022A1.

The invention claimed is:

1. A drivetrain for a wind turbine, comprising:
a horizontal axis main shaft provided with a rotor attachment flange adapted to be connected to a rotor of the wind turbine, wherein the horizontal axis main shaft extends in a horizontal direction during use, and
a main bearing housing having a main body at least partly enclosing the horizontal axis main shaft and extending from a first end to a second end, a distance from the second end to the rotor attachment flange being larger than a distance from the first end to the rotor attachment flange, the main body presenting at the second end a component attachment flange for a connection of the main bearing housing to a further drivetrain component,
the main bearing housing carrying the horizontal axis main shaft via a first bearing and a second bearing, a distance between the second bearing and the rotor attachment flange being larger than a distance between the first bearing and the rotor attachment flange,
the main bearing housing having a first seat for the first bearing, and a second seat for the second bearing, and
the main bearing housing comprising a seat flange extending from the main body at least partly radially inwards, the second seat being located on a distal end of the seat flange,
wherein the seat flange is shaped as a truncated cone, where the distal end is the narrower end of the truncated cone, and where the distance from the distal end to the rotor attachment flange is larger than the distance from the wider end of the truncated cone to the rotor attachment flange.

2. The drivetrain according to claim 1, wherein the second bearing is a roller bearing, wherein the bearing rollers each have a first roller end and a second roller end, the distance between the rotor attachment flange and the first roller end being smaller than the distance between the rotor attachment flange and the second roller end, and the distance between the rotational axis of the horizontal axis main shaft and the first roller end being smaller than the distance between the rotational axis and the second roller end.

3. The drivetrain according to claim 1, wherein a diameter of the component attachment flange is larger than a diameter of the first bearing seat, and a diameter of the second bearing seat is equal to, or smaller than, the diameter of the first bearing seat.

4. The drivetrain according to claim 3, wherein the difference between the component attachment flange diameter and the second bearing seat diameter is at least twice as large as the difference between the diameters of the first and second bearing seats.

5. The drivetrain according to claim 3, wherein the diameter of the component attachment flange is at least 30% larger than the second bearing seat diameter.

6. The drivetrain according to claim 1, wherein a junction between the seat flange and the main body is located at a distance from the second end of the main body.

7. The drivetrain according to claim 1, wherein a diameter of the component attachment flange is larger than a diameter of the second bearing seat.

8. The drivetrain according to claim 1, wherein a distance between the main body and the first seat is smaller than a distance between the main body and the second seat.

9. The drivetrain according to claim 1, wherein the main body of the main bearing housing encloses the horizontal axis main shaft between the first end and the component attachment flange.

10. The drivetrain according to claim 1, wherein the further drivetrain component is a component cover.

11. The drivetrain according to claim 1, wherein a diameter of the second bearing seat is smaller than a diameter of the first bearing seat.

12. The drivetrain according to claim 1, wherein the main bearing housing is configured to fully support the further drivetrain component in a cantilevered manner via the component attachment flange.

13. A horizontal axis wind turbine, comprising:
a tower;
a nacelle being carried on a top of the tower, the nacelle being adapted to rotate around a vertical axis in relation to the tower; and
a drivetrain housed in the nacelle, the drivetrain including:
  a horizontal axis main shaft provided with a rotor attachment flange adapted to be connected to a rotor of the horizontal axis wind turbine,
  a main bearing housing having a main body at least partly enclosing the horizontal axis main shaft and extending from a first end to a second end, a distance from the second end to the rotor attachment flange being larger than a distance from the first end to the rotor attachment flange, the main body presenting at the second end a component attachment flange for a connection of the main bearing housing to a further drivetrain component, and
  the further drivetrain component, wherein the component attachment flange is directly connected to the further drivetrain component,
  the main bearing housing carrying the horizontal axis main shaft via a first bearing and a second bearing, a distance between the second bearing and the rotor attachment flange being larger than a distance between the first bearing and the rotor attachment flange,
  the main bearing housing having a first seat for the first bearing, and a second seat for the second bearing, and
  the main bearing housing comprising a seat flange extending from the main body at least partly radially inwards, the second seat being located on a distal end of the seat flange,
  wherein the seat flange is shaped as a truncated cone, where the distal end is the narrower end of the truncated cone, and where the distance from the distal end to the rotor attachment flange is larger than the distance from the wider end of the truncated cone to the rotor attachment flange.

14. A drivetrain for a wind turbine, comprising:
a horizontal axis main shaft provided with a rotor attachment flange adapted to be connected to a rotor of the wind turbine, wherein the horizontal axis main shaft extends in a horizontal direction during use, and
a main bearing housing having a main body at least partly enclosing the horizontal axis main shaft and extending from a first end to a second end, a distance from the second end to the rotor attachment flange being larger than a distance from the first end to the rotor attachment flange, the main body presenting at the second end a component attachment flange for a connection of the main bearing housing to a further drivetrain component,
the main bearing housing carrying the horizontal axis main shaft via a first bearing and a second bearing, a distance between the second bearing and the rotor attachment flange being larger than a distance between the first bearing and the rotor attachment flange,
the main bearing housing having a first seat for the first bearing, and a second seat for the second bearing, and
the main bearing housing comprising a seat flange extending from the main body at least partly radially inwards across an entire circumference of the main body, the second seat being located on a distal end of the seat flange, the second seat having a constant distance from the main body around the entire circumference of the main body.

15. The drivetrain according to claim 14, wherein a diameter of the second bearing seat is smaller than a diameter of the first bearing seat.

16. The drivetrain according to claim 14, wherein the main bearing housing is configured to fully support the further drivetrain component in a cantilevered manner via the component attachment flange.

17. A horizontal axis wind turbine, comprising:
a tower;
a nacelle being carried on a top of the tower, the nacelle being adapted to rotate around a vertical axis in relation to the tower; and
a drivetrain housed in the nacelle, the drivetrain including:
  a horizontal axis main shaft provided with a rotor attachment flange adapted to be connected to a rotor of the horizontal axis wind turbine,
  a main bearing housing having a main body at least partly enclosing the horizontal axis main shaft and extending from a first end to a second end, a distance from the second end to the rotor attachment flange being larger than a distance from the first end to the rotor attachment flange, the main body presenting at the second end a component attachment flange for a connection of the main bearing housing to a further drivetrain component, and
  the further drivetrain component, wherein the component attachment flange is directly connected to the further drivetrain component, the main bearing housing carrying the horizontal axis main shaft via a first bearing and a second bearing, a distance between the second bearing and the rotor attachment flange being larger than a distance between the first bearing and the rotor attachment flange, the main bearing housing having a first seat for the first bearing, and a second seat for the second bearing, and the main bearing housing comprising a seat flange extending from the main body at least partly radially inwards across an entire circumference of the main body, the second seat being located on a distal end of the seat flange, the second seat having a constant distance from the main body around the entire circumference of the main body.

\* \* \* \* \*